US010785338B2

(12) United States Patent
Singer

(10) Patent No.: US 10,785,338 B2
(45) Date of Patent: *Sep. 22, 2020

(54) MERGING DATA DOWNLOADS WITH REAL-TIME DATA FEEDS

(71) Applicant: Trading Technologies International, Inc., Chicago, IL (US)

(72) Inventor: Scott F. Singer, Green Oaks, IL (US)

(73) Assignee: Trading Technologies International, Inc., Chicago, IL (US)

(*) Notice: Subject to any disclaimer, the term of this patent is extended or adjusted under 35 U.S.C. 154(b) by 275 days.

This patent is subject to a terminal disclaimer.

(21) Appl. No.: 15/711,835

(22) Filed: Sep. 21, 2017

(65) Prior Publication Data

US 2018/0013850 A1  Jan. 11, 2018

Related U.S. Application Data

(63) Continuation of application No. 14/548,425, filed on Nov. 20, 2014, now Pat. No. 9,813,518.

(51) Int. Cl.
*G06F 15/16* (2006.01)
*H04L 29/08* (2006.01)
*H04L 29/06* (2006.01)

(52) U.S. Cl.
CPC ...... *H04L 67/2823* (2013.01); *H04L 65/4084* (2013.01); *H04L 65/604* (2013.01); *H04L 67/42* (2013.01)

(58) Field of Classification Search
CPC . H04L 67/2823; H04L 65/4084; H04L 67/42; H04L 65/604

(Continued)

(56) References Cited

U.S. PATENT DOCUMENTS

2003/0050888 A1* 3/2003 Satow ............... G06Q 40/04
705/37
2005/0181768 A1* 8/2005 Roy ................. G06Q 10/107
455/413

(Continued)

OTHER PUBLICATIONS

International Search Report and Written Opinion for International Application No. PCT/US2015/61281 dated Dec. 30, 2015 (dated Feb. 2, 2016).

*Primary Examiner* — Michael Won
*Assistant Examiner* — Karina J Garcia-Ching
(74) *Attorney, Agent, or Firm* — McDonnell Boehnen Hulbert & Berghoff LLP

(57) ABSTRACT

Methods and apparatuses for merging downloaded data with a real-time data are disclosed. An example includes receiving downloaded item of data from a download connection with a data repository and real-time item of data from a real-time data feed with a data publisher. In response to determining that the downloaded item of data includes the most recent downloaded item of data from the download connection, the downloaded item of data is stored as the last downloaded item of data. In response to determining that the real-time item of data is the most recent real-time item of data received from the real-time data feed, the real-time item of data is stored as the last real-time item of data from the real-time data feed. In response to determining a match between the last downloaded item of data and the last real-time item of data the download connection is ended.

9 Claims, 8 Drawing Sheets

(58) Field of Classification Search
USPC ........................................................ 709/203
See application file for complete search history.

(56) References Cited

U.S. PATENT DOCUMENTS

| | | |
|---|---|---|
| 2007/0288506 A1 | 12/2007 | Matson et al. |
| 2012/0179782 A1* | 7/2012 | Silberstein .............. H04L 67/22 |
| | | 709/217 |
| 2013/0211870 A1 | 8/2013 | Lawson et al. |
| 2014/0278660 A1 | 9/2014 | D'Amico et al. |
| 2016/0150045 A1 | 5/2016 | Singer |

* cited by examiner

MERGING DATA DOWNLOADS WITH REAL-TIME DATA FEEDS

CROSS-REFERENCE TO RELATED APPLICATIONS

This patent application is a continuation of U.S. patent application Ser. No. 14/548,425, filed Nov. 20, 2014, now U.S. Pat. No. 9,813,518, the contents of which are hereby incorporated by reference for all purposes.

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Electronically distributed data will generally include data distributed from the electronic exchange in a real-time, or substantially real-time, data feed. For example, data related to a market for one or more tradeable objects in an electronic trading environment may be distributed or published by an electronic exchange and/or distributed to one or more subscribing entities, devices or client devices in real-time or substantially real-time. The data, also referred to as market data, may include or represent information for a market for the tradeable object.

The client devices receive the market data. The received market data may be further processed by the client devices. For example, a client device may process the market data to identify the market for the tradeable object and/or determine whether to electronically submit data in the form of an order message for the tradeable object to the electronic exchange. The market data may include price for information related to a market for one or more tradeable objects, order data related to trade orders, such as order messages, confirmation messages, and/or other types of messages, and fill data for information relating to one or more fills and/or execution of trade orders.

Orders pending execution for a tradeable object at an electronic exchange (also considered "working orders") are generally kept or organized in an order book for the tradeable object. Orders for the tradeable object that are received by the electronic exchange are verified against orders in the order book to determine whether at least a portion of a quantity of the order can be matched against one or more contra-orders, and if so, at least a portion of the order may be matched. If the order cannot be matched in whole, the order, or the unmatched quantity of the order is placed in a queue in the order book for the tradeable object at the electronic exchange.

Circumstances arise when a current local copy of the order book and/or fill book of the electronic exchange (for example, a full set of Orders or Fills currently known or available) may be kept locally by one or more components of a trading system, such as at a client device. When the client device gets the current order book and/or fill book, the client device will generally download the currently active orders and/or the historical set of fills. This download occurs while the exchange system is also actively delivering or publishing real-time data related to current market data, such as current orders or fills or updates thereto. When the download stream originates from a different end-point, such as different machines, sockets, threads, message topics, and the like, the client device that is downloading the data may need to merge the downloaded data with the data received in a streaming real-time data feed.

The merging of the real-time data with the downloaded data may be complicated, may consume excessive processing resources, and may introduce delays and inaccuracies. For example, in an existing system, real-time data will arrive at the client device as the client device is also downloading already known data. In some circumstances, the real-time data will be held in a client device cache so that the real-time data can be reconciled with the downloaded items at the end of the download. This increases complexity, state management, and memory requirements. Other circumstances first download all of the data and then subscribe/listen to real-time information upon download completion. This system may result in a gap or window of time between when a download of data ends and receiving the real-time data begins, where real-time items can easily be missed by the client device. As such, the client device may need to expend resources to manage the race conditions that happen at the gap. These designs will attempt to best-guess the overlap period and do a supplemental download. The race conditions and timing problems with this can be many. Existing systems that merge downloaded data with real-time data streaming information may first download a finite number of items and then switch over to receiving real-time data via the same connection. Existing systems that use multiple connections require buffering and/or caching of real-time data during a download phase, requiring a post download merge step.

As such, there is a need for merging downloaded data with one or more real-time data feeds.

BRIEF DESCRIPTION OF THE FIGURES

Exemplary embodiments for merging downloaded data with one or more real-time data feeds are disclosed with reference to the following drawings.

Figure 1:
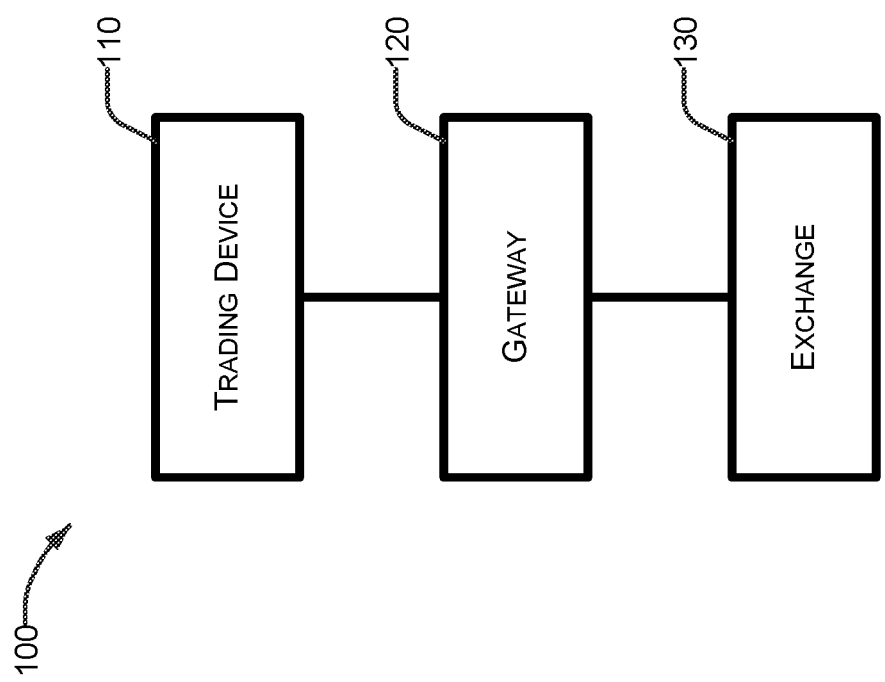
FIG. 1 illustrates a block diagram representative of an example electronic trading system in which certain embodiments may be employed.

Embodiments and features for merging data downloads with one or more real-time data feeds will be better understood when read in conjunction with the provided figures, which illustrate examples. It should be understood, however, that the embodiments for merging data downloads with real-time data feeds are not limited to the arrangements and instrumentality shown in the attached figures.

DETAILED DESCRIPTION

The disclosure generally relates to merging and reconciling downloaded data with one or more real-time data feeds, and more particularly, to merging book downloads with real-time market data feeds.

Certain embodiments reduce and/or minimize complexities for merging two data streams. In an embodiment, downloaded data may be merged with one or more real-time data feeds. Embodiments for merging data downloads with real-time data feeds may minimize state management. Embodiments for merging data downloads with real-time data feeds also or alternatively may minimize caching and/or reconciliation steps for merging downloaded data with real-time data feeds and/or may be eliminated altogether. Embodiments for merging downloaded data with real-time data feeds also or alternatively may minimize and/or eliminate race conditions. As such, embodiments may not have complex handling or missed-data recovery steps.

Systems, methods and apparatuses may include a client device, or even a server-side device, to which a real-time, or a substantially real-time, data feed is provided. In an embodiment, the data feed includes, provides, makes available or otherwise publishes real-time or substantially real-time information. The information, for example, may be made provided from an electronic exchange and is generally representative of a market and/or market conditions for a tradeable object at the electronic exchange. The information is generally provided real-time, or substantially real-time (referred to herein collectively as real-time), such as a data feed or streaming data including data related to, representing, and/or recording events as near as physically possible to when the event occurred. Thus, the information may be considered live data.

The client device also may have access to a data repository or order repository, such as a database. The database generally will include, record, and/or accessibly store information made available or otherwise included in the data feed.

In an example, the client device may be considered to join the data stream. For example, the client device may join the data stream when the client device first begins listening to, subscribing to, or otherwise receiving the real-time data in the data feed. The client device also may establish a download connection (or session). The download connection may be established with a server that has a database of stored sequenced data related to the real-time data in the data feed. The download connection receives downloaded items from the server to provide downloaded data from the database.

The downloaded data may be considered to not be bounded by any pre-determined size of data to be downloaded or set of data to be downloaded. That is, the download connection will provide downloaded data from the database of the server to the client device, starting at a beginning position or specified reference point in the sequence of data stored in the database until an end or stop signal is provided from the client device. As such, the download connection may be considered virtually unlimited or another stream of data to the client device in addition to the real-time data from the data fee.

The real-time data may be considered to include live items, such as data generated by or provided by an electronic exchange for a market for a tradeable object. The real-time data may be considered live in the sense that the items included in the real-time data are provided without substantial processing delay and/or with minimal processing delay. The real-time data may be considered live in the sense that the items are provided or made available in as short amount of time as reasonably possible (such as due to regulations, physical limitations, combinations thereof, and the like) after an event represented by the data occurred or is generated. Real-time data may be considered to be available with immediacy or as expediently as possible with respect to the occurrence of the event represented by the data.

As live items are generated they may be transmitted from a point at which the item originated, such as an order server or order-connector, to the server for accessible storage (such as an order repository) as well as published for immediate or near immediate distribution, such as to a client device. The order repository generally stores or caches all or substantially all items received at the order repository.

The client may access the order repository to download the data stored therein, such as the recorded live items. While downloading the recorded live items, the client device may record, store, log, cache or otherwise identify a sequence number of each item that is being received in the download. For each recorded live item, the sequence number may be identified as each recorded live item is received. The client device may also record, log, cache, note or otherwise store the same sequence number of each live item as the live item is received in the real-time data feed.

The client device generally compares the sequence of the downloaded items with the items received in the real-time data feed to determine when to consume only the real-time data feed. For example, when the sequence numbers match, the downloaded set may be considered fully inclusive of the real-time items that have been received. After a match is determined, for example, downloaded items may be considered redundant to the real-time items received via the real-time data feed. Prior to determining that the sequence numbers match, the client device may handle items from the real-time data feed simply by noting the sequence ID and ignoring the item. For example, the client device may consume items from the download and not the real-time data feed until after a match of sequence number has been determined. In an embodiment, a sequence ID may be included in a header of the messages so that a body of the message need not be unpacked.

When a match between the sequence numbers received via the download and the sequence number received via the real-time data feed is determined, the download may be considered complete. As such, the client device may halt downloading items from the order repository. For example, the client device may send a download-end (complete/disconnect and the like) to the order repository 650 to end the download connection. In addition, the client device may start consuming only those items that have been received from the real-time data feed.

Example systems may merge data from multiple sources for downloading data and a single source for the real-time data. This method could also be extended to a single download source and multiple sources of real-time. This method could also be extended to a multiple download sources and multiple sources of real-time.

Although this description discloses embodiments including, among other components, software executed on hardware, the exemplary embodiments herein are merely illustrative and are not to be considered as limiting. For example, it is contemplated that any or all of the hardware and software components may be embodied exclusively in hardware, exclusively in software, exclusively in firmware, or in any combination of hardware, software, and/or firmware.

I. Brief Description for Merging Data Downloads with Real-Time Data Feeds

An exemplary method for merging downloaded data with a real-time data includes receiving a downloaded item of data from a download connection with a data repository and comparing the downloaded item of data with a last downloaded item of data to determine whether the downloaded item of data comprises a most recent downloaded item of data received from the download connection. In response to determining that the downloaded item of data comprises the most recent downloaded item of data received from the download connection, the downloaded item of data is stored as the last downloaded item of data from the download connection. In addition, the exemplary method also includes receiving a real-time item of data from a real-time data feed of a data publisher and comparing the real-time item of data with a last real-time item of data to determine a most recent real-time item of data received from the real-time data feed. In response to determining that the real-time item of data is the most recent real-time item of data received from the real-time data feed, the real-time item of data is stored as the last real-time item of data from the real-time data feed. With the last downloaded item of data and the last real-time item stored, the method includes comparing the last downloaded item of data and the last real-time item stored to determine a match. In response to determining that the last item of data from the download connection matches the last real-time item of data from the real-time data feed, the download connection may be ended.

An exemplary computer readable medium has instructions stored thereon for merging downloaded data with a real-time data. The acts generally include receiving a downloaded item of data from a download connection with a data repository and comparing the downloaded item of data with a last downloaded item of data to determine whether the downloaded item of data comprises a most recent downloaded item of data received from the download connection. In response to determining that the downloaded item of data comprises the most recent downloaded item of data received from the download connection, the downloaded item of data is stored as the last downloaded item of data from the download connection. In addition, the acts also include receiving a real-time item of data from a real-time data feed for a data publisher and comparing the real-time item of data with a last real-time item of data to determine a most recent real-time item of data received from the real-time data feed. In response to determining that the real-time item of data is the most recent real-time item of data received from the real-time data feed, the real-time item of data is stored as the last real-time item of data from the real-time data feed. With the last downloaded item of data and the last real-time item of stored, the method includes comparing the last downloaded item of data and the last real-time item of stored to determine a match. In response to determining that the last item of data from the download connection matches the last real-time item of data from the real-time data feed, the download connection may be ended.

An exemplary client device that is configured to merge downloaded data with a real-time data feed includes a data receiver that is configured to receive a downloaded item of data from a download connection with a data repository and a real-time item of data from a real-time data feed with a data publisher. The exemplary client device also includes an electronic storage medium configured to store the downloaded item of data and the real-time item of data. The exemplary client device also includes an electronic processor that is configured to compare the downloaded item of data with a last downloaded item of data to determine whether the downloaded item of data comprises a most recent downloaded item of data received from the download connection and the real-time item of data with a last real-time item of data to determine a most recent downloaded item of data received from the download connection. In response to determining that the downloaded item of data comprises the most recent downloaded item of data received from the download connection, the electronic processor is further configured to cause the electronic storage medium to record the downloaded item of data as the last downloaded item of data from the download connection. In in response to determining that the real-time item of data is the most recent real-time item of data received from the real-time data feed, the electronic processor is configured to cause the electronic storage medium to store the real-time item of data as the last real-time item of data from the real-time data feed. In response to determining that the last item of data from the download connection matches the last real-time item of data from the real-time data feed, the electronic processor is configured to cause the data receiver to end the download connection.

II. Example Electronic Trading System

FIG. 1 illustrates a block diagram for an exemplary electronic trading system 100 in which embodiments for merging data downloads with real-time data feeds may be employed. The exemplary electronic trading system includes a trading device 110, a gateway 120, and an exchange 130. The trading device 110 (also referred to as a client device) is in communication with the gateway 120. The gateway 120 is in communication with the exchange 130. As used herein, the phrase "in communication with" encompasses direct communication and/or indirect communication, such as using one or more intermediary components and/or through one or more intermediary components. The exemplary electronic trading system 100 may include and/or be in communication with additional components, subsystems, and elements to provide additional functionality and capabilities without departing from the embodiments for merging data downloads with real-time data feeds.

In operation, the trading device 110 may receive market data, such as streaming real-time market data (also referred to as a market data feed, live market feed, streaming market information, live data, and the like) distributed from the exchange 130. The market data may be received through the gateway 120.

The trading device 110 also may provide an output for the processed market data. For example, the trading device 110 may include a monitor by which market data that is processed in a human readable form may be provided, such as to a user of the trading device 110. The trading device 110 may process the market data to present the data via an interactive media so that a user may elect to submit a message.

The trading device 110 also may use the market data as a basis for electronically communicating an order message. For example, the market the market information may be received and processed by the trading device 110 according to an algorithm. The market data may be processed, for example, to determine whether to transmit an order message to buy or sell one or more tradeable objects, to the exchange 130. The trading device 110 also or alternatively may process the market data according to a predefined configuration or algorithm to determine whether to transmit an order message to buy or sell one or more tradeable objects, to the exchange 130 with no or minimal input from a user of the trading device.

Market data may include or represent information for live events or for multiple recurring events. For example, the market data may include or represent information for a market for a tradeable object where the market data includes the inside market, market depth, last traded price ("LTP"), a last traded quantity ("LTQ"), combinations thereof and the like. The inside market generally refers to the highest bid price (also referred to as a best bid) and the lowest ask price (also referred to as best ask or best offer) that are available in the market for trading the tradeable object at a point in time (since the inside market may vary over time). That is, because the best bid and/or best ask may change from one moment in time to a next moment in time, the inside market also may change accordingly. Market depth generally refers to quantities available at price levels in the market. The market depth may include quantities available at the prices for the inside market. The market depth also or alternatively may include quantities at prices away from the inside market. The market depth may have "gaps," such as a price level in the market at which the tradeable object may be traded, but at which no quantity is available for trading.

The price levels of the inside market and the market depth can be provided as value levels, which can encompass prices as well as derived and/or calculated representations of value. For example, value levels are displayed as net change from an opening price. As another example, value levels are provided as a value calculated from prices in two other markets. In another example, value levels include consolidated price levels.

A tradeable object is generally considered anything that may be traded. For example, a quantity of the tradeable object may be bought or sold at a price in a market. A tradeable object may include financial products, stocks, options, bonds, future contracts, currency, warrants, funds derivatives, securities, equities, commodities, swaps, interest-rate products, index-based products, traded events, goods, or a combination thereof. A tradeable object may be considered a real tradeable object, such as a product listed and/or administered by an exchange, and a synthetic tradeable object, such as a product defined by the user. A tradeable object also may be a combination of real or synthetic products. There may be a synthetic tradeable object that corresponds and/or is similar to a real tradeable object.

An order message is a message that includes information related to a tradeable object that is communicated with an electronic exchange. For example, an order message may relate to a trade order being submitted to an electronic exchange to buy or sell a tradeable object and/or an order pending at an electronic exchange to buy or sell a tradeable object. A trade order may be a command to place an order to buy or sell a tradeable object; a command to initiate managing orders according to a defined trading strategy; a command to change, modify, or cancel an order; an instruction to an electronic exchange relating to an order; combinations thereof and the like.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, and/or one or more combinations thereof. The trading device 110 may include a single or multi-core processor in communication with a memory or other storage medium configured to accessibly store one or more computer programs, applications, libraries, computer readable instructions, and the like, for execution by the processor. The trading device may be specifically configured to operate in an electronic trading environment.

As used herein, the phrases "configured to" and "adapted to" encompass a feature where an element, structure, component, and/or device has been modified, arranged, changed, capable of or varied to perform a specific function or for a specific purpose.

By way of example, the trading device 110 may include a computing device. In an example, the trading device 110 has an electronic processor and is configured to run X_TRADER®, which is an electronic trading platform provided by Trading Technologies International, Inc. of Chicago, Ill. ("Trading Technologies"). As another example, the trading device 110 is a server running a trading application providing automated trading tools such as ADL®, AUTOSPREADER®, and/or AUTOTRADER™, which are also provided by Trading Technologies. The trading device 110 may include a trading terminal in communication with a server, where collectively the trading terminal and the server may be considered the trading device 110. The trading device 110 may be any desktop, handheld, and/or any other portable device configured to electronically execute instructions at least temporarily stored in an electronic storage medium.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may control, own, operate, administer, configure, or otherwise use the trading device.

The trading device 110 may include one or more trading applications. A trading application may facilitate and/or improve electronic trading. A trading application provides one or more electronic trading tools. For example, a trading application stored by a trading device 110 may be executed by the trading device 110 to receive, arrange and/or display market data in one or more trading windows. In another example, a trading application may include an automated spread trading application providing spread trading tools. In yet another example, a trading application may include an algorithmic trading application that automatically executes an electronic process to perform predetermined actions, such as placing an order, modifying an existing order, deleting an order in response to one or more triggering events. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions, such as instructions that are stored in and accessible from a computer readable medium for execution by an electronic processor. A computer readable medium may include one or more types of volatile and non-volatile storage media, including random access memory, read-only memory, programmable read-only memory, electrically programmable read-only memory, electrically erasable read-only memory, flash memory, any combination thereof, and/or any other tangible data storage device. As used herein, the term non-transitory or tangible computer readable medium may be considered to include any type of computer readable storage media.

The trading application may include one or more components or modules. The components or modules of a trading application may be loaded into the computer readable medium of the trading device 110 from another computer readable medium. For example, the trading application (or updates to the trading application) may be accessibly stored for retrieval by the trading device 110 or a server from which the trading device 110 may retrieve the trading application. The trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to electronically communicate data. For example, order messages may be electronically communicated to the exchange 130. The order messages may be communicated to the exchange 130 through gateway 120. The trading device 110 may be adapted to electronically communicate order messages to a simulated exchange in a simulation environment so as to not effectuate real trades (i.e., simulated trades).

The order messages may be sent in response to a user input. For example, the trading device 110 may be configured to send an order message in response to a manual input of a user. The trading device 110 also or alternatively may be configured to allow a user to manually input one or more parameters for a trade order (for example, an order price and/or quantity). The trading device 110 may include an automated trading tool, or semi-automated trading tool, provided by a trading application to calculate one or more parameters for a trade order. The calculated trade order may be automatically submitted to the exchange 130, may be sent to the exchange 130 in response to a user input an combinations thereof.

An order message may be sent in one or more data packets. An order message may be sent such as sharing the order message with the exchange 130 via a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies.

The gateway 120 may include one or more electronic computing platforms. For example, the gateway 120 may be implemented as one or more desktop computer, hand-held device, laptop, server, portable computing device, trading terminal, embedded trading system, workstation operating under a single or multi-core processor, an algorithmic trading system such as a "black box" or "grey box" system, cluster of computers, and/or any combination thereof.

The gateway 120 may facilitate electronic communication, such as communication between devices. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed herein, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by one or more entities, such as an exchange entity. Example exchange entities include the CME Group (including the Chicago Mercantile Exchange, Chicago Board of Trade, and New York Mercantile Exchange, Kansas City Board of Trade), the London International Financial Futures and Options Exchange, the Intercontinental Exchange, and Eurex. The exchange 130 may include one or more electronic matching systems, such as a computer, server, and other computing devices, which is adapted to allow tradeable objects available for trading, to be bought and sold. The exchange 130 may include separate entities, some of which list and/or administer tradeable objects and others which receive and match orders, for example. The exchange 130 may administer communication between and/or to another exchange to provide access for trading tradeable objects at that exchange. The exchange 130 may include an electronic communication network ("ECN"), for example.

The exchange 130 may be an electronic exchange. The exchange 130 is adapted to receive order messages and match contra-side trade orders to buy and sell tradeable objects. In an example, order for the tradeable object are received at the exchange and matched according to the matching system, where a buy order is matched with a sell order. Unmatched trade orders may be listed for trading by the exchange 130, or otherwise included in an order book and pending execution at the exchange. An order to buy or sell a tradeable object that is received and confirmed by the exchange and not matched may be considered to be a working order until it is matched to a contra order, filled completely or cancelled. If only a portion of the quantity of the order is matched, then the partially unfilled portion of the order generally remains a working order. The trade orders may include trade orders received from the trading device 110 or other devices in communication with the exchange 130. For example, typically the exchange 130 will be in communication with a variety of other trading devices (which may be similar to trading device 110) which also provide trade orders to be matched.

The exchange 130 may be adapted to provide, publish or otherwise distribute market data. Market data may be provided in one or more messages or data packets. Market data also or alternatively may be available through a shared memory system. For example, the exchange 130 may publish a data feed to subscribing devices, such as the trading device 110 or gateway 120. The data feed may be provided to data providers who also republish the data to the trading device 110 or gateway 120. The data feed may include market data, such as through streaming messages that may be provided in real-time or substantially real-time.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
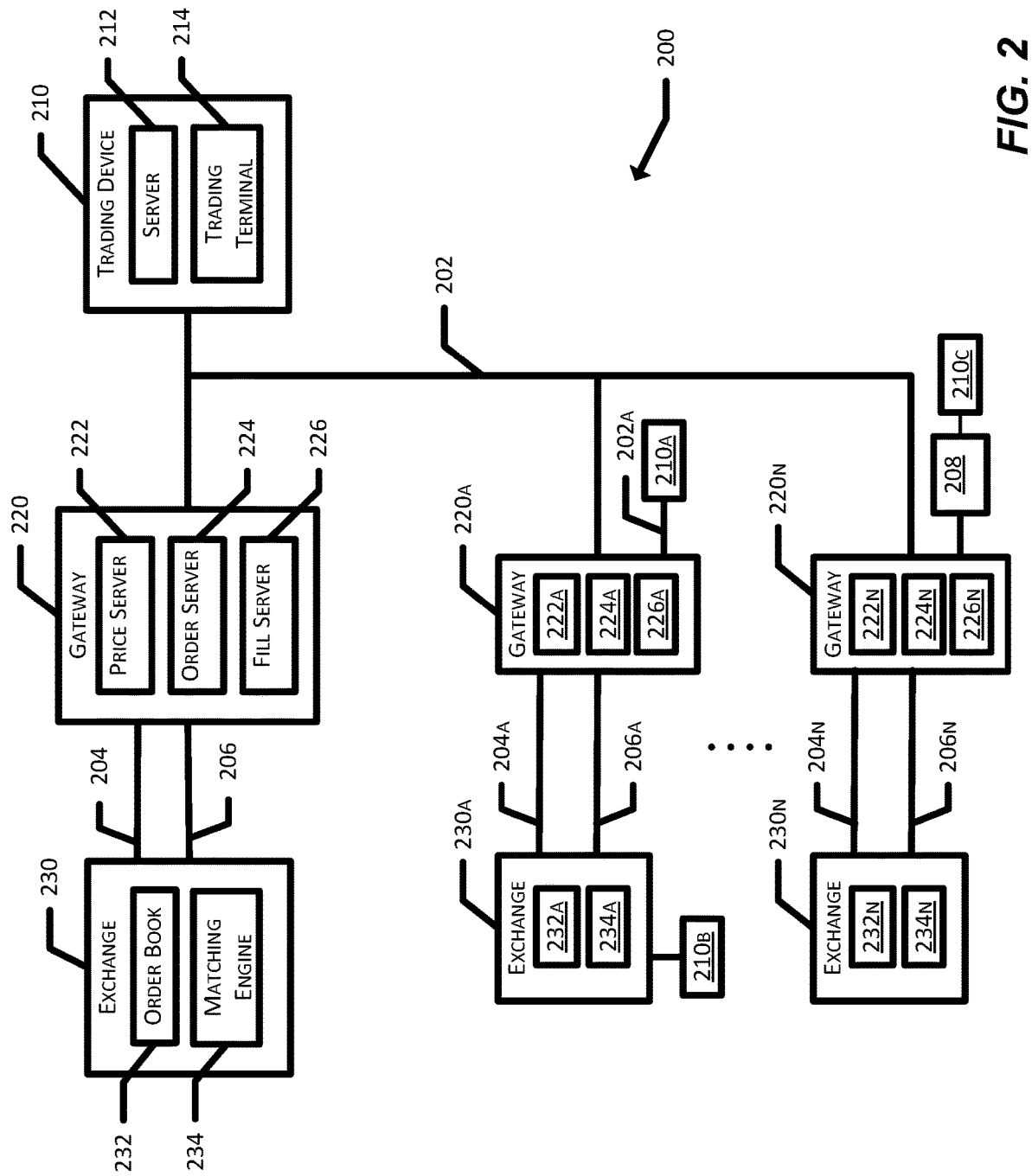
FIG. 2 illustrates a block diagram of another example electronic trading system in which certain embodiments may be employed.

FIG. 2 illustrates a block diagram of an exemplary electronic trading system 200 in which embodiments for merging data downloads with real-time data feeds may be employed. The exemplary electronic trading system 200 includes a trading device 210 that may utilize one or more communication networks to communicate with one or more gateways 220, 220A to 220N and one or more exchanges 230, 230A to 230N. For example, the trading device 210 utilizes network 202 to communicate with the gateway 220, and the gateway 220, which utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with any number ("N") additional gateways (individually identified as gateways 220A-220N, which may be similar to gateway 220) and any number ("N") additional exchanges (individually identified as exchanges 230A-230N, which may be similar to exchange 230) by way of the network 202 (or other similar networks). Additional networks (individually identified as networks 204A-204N and 206A-206N, which may be similar to networks 204 and 206, respectively) may be utilized for communications between the additional gateways and exchanges. The communication between the trading device 210 and each of the additional exchanges 230A-230N need not be the same as the communication between the trading device 210 and exchange 230. Generally, each exchange may have a preferred technique and/or format for communicating with a trading device, a gateway, the user, or another exchange. Although FIG. 2 shows a one-to-one mapping between gateways 220A-220N and exchanges 230A-230N other mappings are included with the scope of the invention. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210A-210N, which may be similar to trading device 210, may be connected to one or more of the gateways 220A-220N and exchanges 230A-230N. For example, the trading device 210A may communicate with the exchange 230A via the gateway 220A and the networks 202A, 204A and 206A. In another example, the trading device 210B may be in direct communication with exchange 230A. In another example, trading device 210C may be in communication with the gateway 220N via an intermediate device 208 such as a proxy, remote host, or WAN router.

The trading device 210, which may be similar to the trading device 110 in FIG. 1, may include a server 212 in communication with a trading terminal 214. In an example, the server 212 is located geographically closer to the gateway 220 than the trading terminal 214. For example, server 212 may be proximate the gateway to reduce latency delay. In operation, the trading terminal 214 may provide a trading screen to a user and communicate commands to the server 212. For example, a trading algorithm may be deployed to the server 212 for execution based on market data. The server 212 may execute the trading algorithm without further, or with minimal, input of the user. In another example, the server 212 includes a trading application for automated trading tools and to communicate back to the trading terminal 214. The trading device 210 may include additional, different, or fewer components.

In operation, the network 202 may be a multicast network where the network allows the trading device 210 to communicate with the gateway 220. Data on the network 202 may be logically separated by subject such as, for example, by prices, orders, or fills. As a result, the server 212 and trading terminal 214 can subscribe to and receive data, such as data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The market may include open, pending and/or working orders for the tradeable object. The order server 224 processes order data. Order data is data related to a user's trade orders. For example, order data may include order messages, confirmation messages, and/or other types of messages. The fill server collects and provides fill data. Fill data includes data relating to one or more fills and/or execution of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220A-220N may each include instances of the servers 222, 224, and 226 (individually identified as servers 222A-222N, 224A-224N, and 226A-226N).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is generally a database that includes data relating to trade orders that have been submitted to the exchange 230 and have not yet been fully matched or executed. For example, the order book 232 may include data relating to a market for a tradeable object, such as the inside market and market depth at one or more price levels. The order book 232 also or alternatively may include data relating to the last traded price and the last traded quantity. The matching engine 234 may match contra-side bids and offers pending in the order book 232. For example, the matching engine 234 may execute one or more matching systems or matching algorithms for matching contra-side bids and offers. A sell order is contra-side to a buy order, and a buy order is contra-side to a sell order. A matching algorithm may match contra-side bids and offers at the same price. In certain embodiments, the additional exchanges 230A-230N may each include order books and matching engines (individually identified as the order book 232A-232N and the matching engine 234A-234N, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
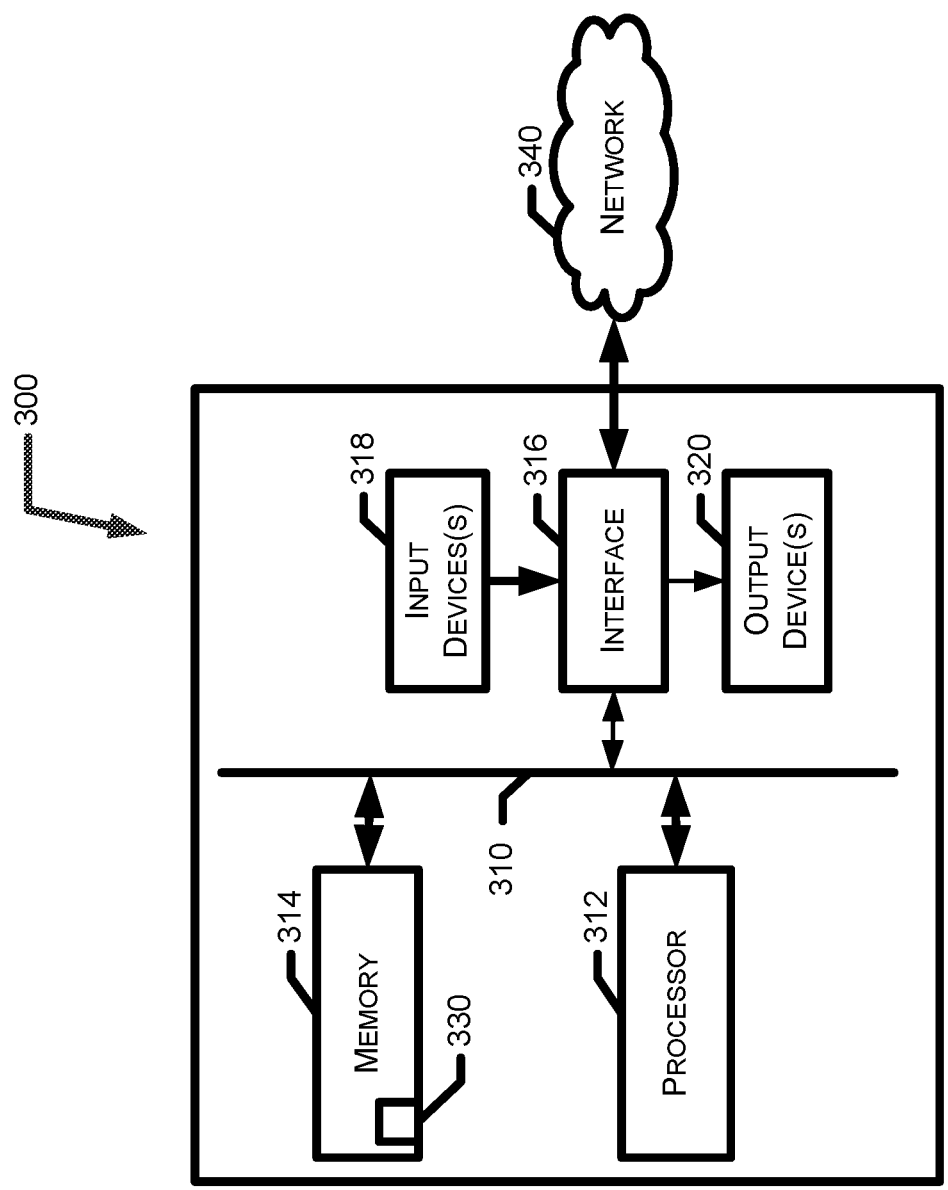
FIG. 3 illustrates a block diagram of an example computing device which may be used to implement the disclosed embodiments.

FIG. 3 illustrates a block diagram of an example computing device 300 which may be used to implement embodiments for merging data downloads with real-time data feeds. The trading device 110 of FIG. 1 may include one or more computing devices 300, the gateway 120 of FIG. 1 may include one or more computing devices 300, and the exchange 130 of FIG. 1 may include one or more computing devices 300. In an example, the trading device 110 may be referred to as a computing device.

The computing device 300 includes a communication network 310, a processor 312, a memory 314, an interface 316, an input device 318, and an output device 320. The computing device 300 may include additional, different, or fewer components, such as multiple communication networks, multiple processors, multiple memory, multiple interfaces, multiple input devices, multiple output devices, and/or any combination thereof. As another example, the computing device 300 may not include an input device 318 or output device 320.

The exemplary computing device 300 shown in FIG. 3 includes a processor 312 coupled to a communication network 310. The communication network 310 may include a communication bus, channel, electrical or optical network, circuit, switch, fabric, or other mechanism for communicating data, such as communicating data between components and/or module of the computing device 300. The communication network 310 may be communicatively coupled with and transfer data between any of the components of the computing device 300.

The processor 312 may be any suitable processor, processing unit, controller or microprocessor. The processor 312 may include one or more general processors, digital signal processors, application specific integrated circuits, field programmable gate arrays, analog circuits, digital circuits, programmed processors, and/or combinations thereof. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible and/or non-transitory media, such as computer readable storage media. Computer readable storage media may include various types of volatile and non-volatile storage media, including random access memory, read-only memory, programmable read-only memory, electrically programmable read-only memory, electrically erasable read-only memory, flash memory, any combination thereof, or any other tangible data storage device. The memory 314 may include any desired type of mass storage device including hard disk drives, optical media, magnetic tape or disk, and the like.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312. The memory 314 may store instructions that are executable, such as by processor 312. The instructions may be executed to perform one or more of the acts or functions, such as those shown in the figures.

The memory 314 may store a trading application 330. In certain embodiments, the trading application 330 may be accessed from or stored in one or more locations. The locations may store all or portions of the trading application 330. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Exemplary System for Merging Downloaded Data with a Real-Time Data Feed

Figure 4:
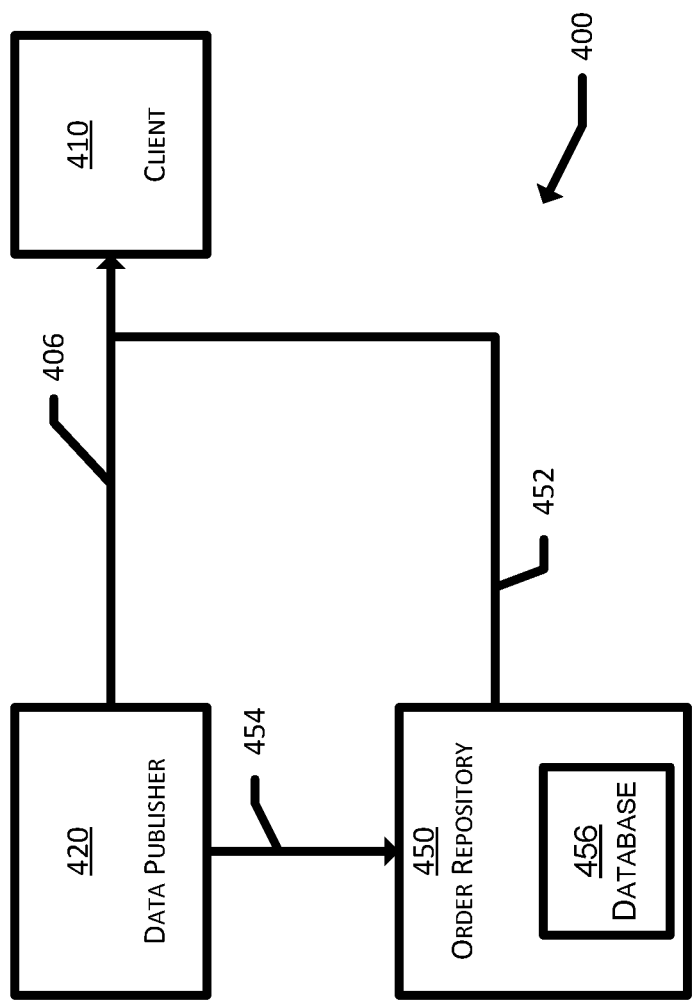
FIG. 4 illustrates a block diagram for an environment in which an example for merging real-time data with the downloaded data may be embodied.

FIG. 4 shows an exemplary system 400 for merging real-time data with the downloaded data. The exemplary system 400 includes a client device 410, a data publisher 420 and an order repository 450, where the client device 410 is communicatively coupled to the data publisher via communications link 406 and to the order repository 450 via communication link 452. In addition, the data publisher 420 is communicatively coupled with the order repository via communications link 454. Although shown as different, communication links 454, 406 and 452 may be the same or different.

The client device 410 may be similar to the trading device 110 in FIG. 1, trading device 210 in FIG. 2 and computing device 300 in FIG. 3. The client device 410 may include one or more electronic computing platforms, such as a desktop computer, hand-held device, laptop, server, a portable computing device, a trading terminal, an embedded trading system, a workstation, an algorithmic trading system such as a "black box" or "grey box" system, cluster of computers, and/or one or more combinations thereof. The client device 410 may include a single or multi-core processor in communication with a memory or other storage medium configured to accessibly store one or more computer programs, applications, libraries, computer readable instructions, and the like, for execution by the processor. The client device 410 may be specifically configured to operate in an electronic trading environment.

The data publisher 420 may be any device or system configured to provide real-time, or substantially real-time data. For example, live items generated by or originated at the data publisher may be transmitted via a data feed. In an example, the data publisher 420 may be an exchange similar to exchange 130 of FIG. 1 and exchange 230 of FIG. 2 where the data publisher 420 is configured to publish, distribute or otherwise make available data related to a market for one or more tradeable objects in an electronic trading environment. That data may originate from, for example, an order server order-connector of the exchange and be published for immediate or near immediate distribution via a data feed, such as communications links 406 and 454. That data may distributed via a communications links 406 and 454 simultaneously or substantially simultaneously. The data may be published, distributed or otherwise made available to one or more subscribing entities, devices or client devices in real-time or substantially real-time. The data, also referred to as market data, may include or represent information for a market for the tradeable object. The data may be considered live in the sense that the items included in the real-time data are provided or made available without substantial processing delay and/or with minimal processing delay. The data may be considered live in the senses that the items are provided or made available in as short amount of time as reasonably possible (such as due to regulations, physical limitations, combinations thereof, and the like) after an event represented by the item occurred or is generated. Real-time data may be considered to be available with immediacy or as expediently as possible with respect to the occurrence of the event represented by the data. The data publisher 420 also or alternatively may include a data distributer or distribution network.

The order repository 450 is configured to accessibly store data. Order repository may be also configured to electronically communicate the accessibly stored data. The order repository may include a database 456 recording and/or accessibly storing information made available or otherwise provided to the data base in a data feed, such as communications link 454.

The client device 410 is adapted to electronically receive data from the data publisher 420 via the communication link 422. In an example, the data publisher 420 is an exchange where the client device 410 receives market data, such as streaming real-time market data distributed from the exchange. Live items may be generated by the exchange and transmitted from a point at which the item originated, such as an order server or order-connector, to the client device 410 via communications link 422. Although not shown, the market data may be received by the client device 410 through a gateway, as discussed above.

The communication link 422 may be a network. For example, the communication link 422 includes a multicast network that allows the client device 410 to communicate with the data publisher 420. Data on such network may be logically separated by subject such as, for example, by prices, orders, or fills so that the client device 410 may selectively subscribe to and receive data, such as data relating to prices, orders, or fills.

The client device 410 is also shown communicatively coupled with the order repository 450 via communication link 452. Communication link 452 may be the same as or different than communication link 406. In the example, the client device 410 is adapted to electronically receive data from the order repository 450 via the communication link 452. The data that is received by the client device 410 may be retrieved from database 456 of the order repository 450 via the communication link 452. The order repository 450 may push data in the database 456 to the client device 410, or the client device 410 may pull, or otherwise call the data from the order repository 450 via the communication link 452. Although not shown, the data may be received by the client device 410 through a gateway, as discussed above. The data may be logically separated by subject such as, for example, by prices, orders, or fills so that the client device 410 may selectively subscribe to and receive data, such as data relating to prices, orders, or fills.

FIG. 4 also shows order repository 450 communicatively coupled with the data publisher 420 via communications link 454. Communications link 454 may be the same or different than communication link 406. As live items are generated or otherwise originated they may be transmitted from a point at which the item originated and communicated to the order repository 454. For example, the data publisher 420 is an exchange at which live items originate, such as at an order server or order-connector of the exchange, and are transmitted for immediate or near immediate distribution. In the example the live items include market data generated at the exchange and transmitted for immediate or near immediate distribution. The market data is transmitted to the order repository 450 via the communications link 454 as the market data is generated. The order repository 450 will generally store or cache all or substantially all items received at the order repository.

The stored items may be accessible from the order repository 450. For example, the client device 410 may obtain the live items from the order repository 450. Because the order repository 450 stores the same items as provided by the data publisher 420, those items are available from both or either the order repository 450 and the data publisher 420. The items are available to the client device 410 from the data publisher 420 via communications link 406 and also available from the order repository 450 via communications link 452. The items stored by the order repository 450 may not be available at a time when the item is available from the data publisher. The items from the order repository 450 may be considered delayed with respect to the items available from the data publisher 420. For example, an item available from the data publisher 420 may be considered immediately available or near immediately available for consumption. Whereas, due at least in part to time for receiving, processing, storing, publishing and the like at the order repository 450, the item may not be considered immediately or near immediately available for consumption. Because items from the data publishers may be considered immediately available or near immediately available for consumption, and not delayed, the items may be available before the item is available from the order repository 450.

Items stored by the order repository 450 may be available for consumption, whereas those items stored by the order repository may not be available for consumption from the data publisher 420. Because the order repository 450 stores items received at the order repository 450 and the data publisher 420 generally provides live items, a time at which the live item was published by the data publisher 420 may have past. Since the item was provided by a data feed 454 from the data publisher and provided to, received by and stored by the order repository the item may be available from the order repository 450 at a later time, such as a time after which the item was published by the data publisher 420.

In an embodiment, the client device 410 may begin listening to, or subscribing to, the data feed provided via communications link 406 from the data publisher. By listening to the data feed, the client device 410 may receive live items provided by the data publisher 420. The client device 410 also may establish a download connection (also referred to as a session) with order repository 450 to receive items stored therein. During the session, the client device 410 may receive downloaded items from the order repository 450. The session may be considered not bounded by any predetermined size or set of items. For example, the session may start either from a known beginning or a specified reference point but may not have a predetermined end point, period, or end time. During the session, the order repository 450 may provide the items to the client device 410 until the order repository receives a request to stop the download. In addition or alternatively, the client device 410 may access the items from the order repository 450 until a decision is made that the client device 410 no longer needs to access the items from the order repository. In an embodiment, the client device 410 accesses the order repository 450 to download the data stored therein, such as the recorded live items in the database 456. While downloading the recorded live items from the database 456, the client device 410 also may receive live items from the data publisher 420. For example, a trader may user the client device 410, such as a trading device, to connect to a data publisher 420, such as an exchange, to receive market data via communications link 406 while the client device also receives market data stored in the order repository 450 via communications link 452.

Figure 5:
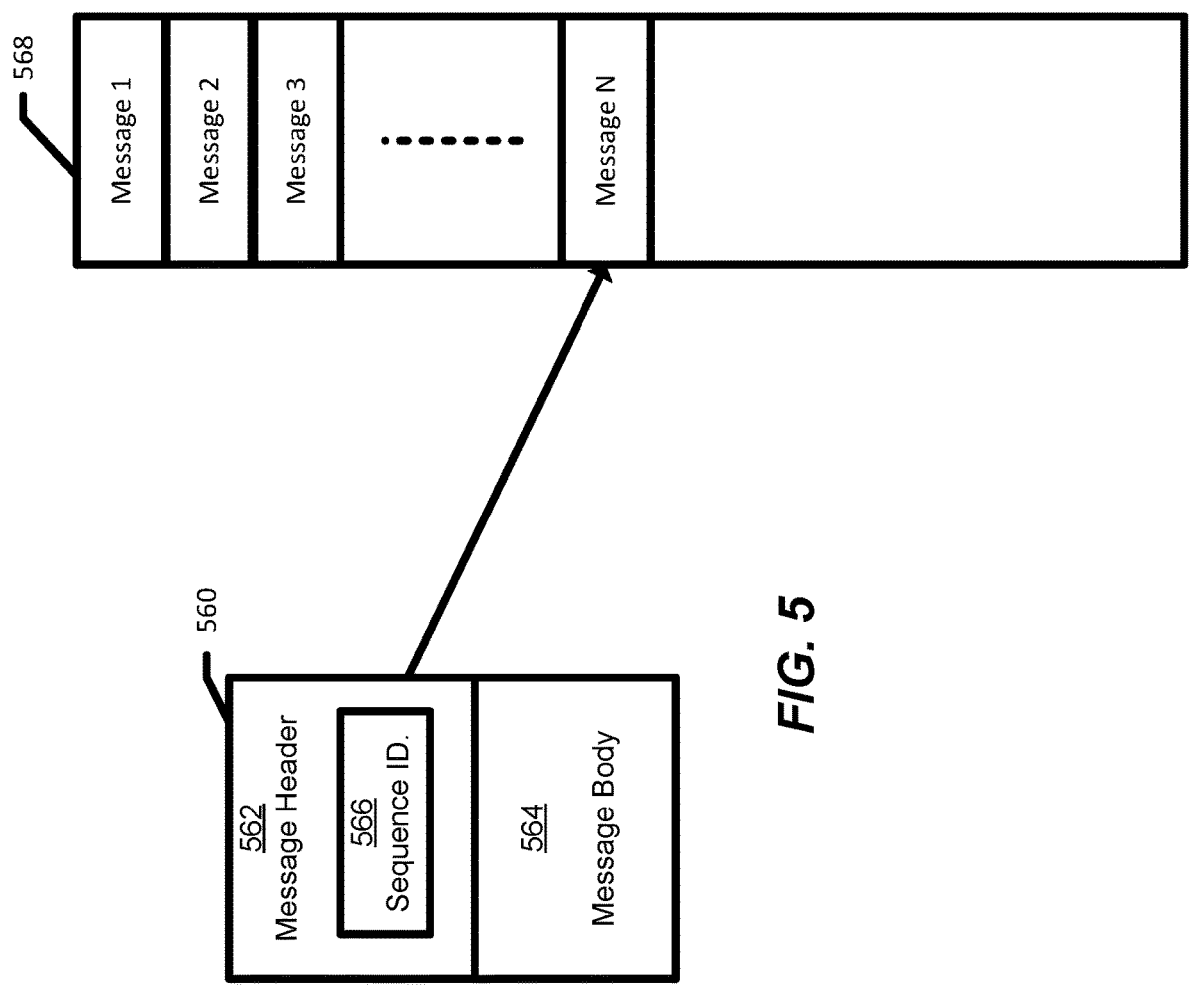
FIG. 5 illustrates a block diagram of an item distributed by a network for merging with real-time data according to disclosed embodiments.

The items provided by the data publisher 420 and accessibly stored by the order repository 450 generally are provided in one or more packet of information. FIG. 5 illustrates an example of an item 560 provided in a download feed, such as communications link 452 of FIG. 4, and a real-time data feed, such as communication link 406 of FIG. 4. The item 560 may be a message or other structure that is transmitted over a network. As shown, the item includes a message header 562 and a message body 564.

The message header 562 generally includes information that is placed before the message data 564 in a data string. The message header normally includes control information relate to information about the data that the message. For example, the message header may include information for how the item is to be interpreted and used. The message header may also serve as an identifier and/or control link across a network by which the message is communicated. The message body 564 generally includes the data being transmitted. The message body may be referred to as the payload. In an example, the message body includes information related to a last traded quantity for a tradeable object traded at an exchange, and the message header includes information for identifying the message.

In an embodiment, the message header 562 includes a sequence ID 566. The sequence ID 566 may identify a position of the item 560 relative to other items in an ordered sequence of items, such as items distributed in a streaming data feed. For example, the item 560 may be one of a sequence of numbered items and the sequence ID 566 may be a unique number that identifies a place or relative position of the item 560 with respect to other items in the sequence of numbered items. In addition or alternatively, the sequence ID 566 may be a unique time stamp that identifies a moment in time at which the data in the message body originated, was generated or was otherwise created. Since generally only one item may originate or be generated at any moment in time, a stamp identifier will be unique. For example, the sequence ID may be a globally unique identifier ("GUID" or "UUID"), a network identifier, a message ID, message sequence number, and the like.

The client device, such as client device 410 of FIG. 4, may be configured to track, identify, and/or otherwise process the items to include, store or otherwise record each item 560 in a database 568 or other storage medium suitable for accessibly storing electronic data. For example, the client device 410 may record or otherwise identify the sequence ID 566 of each item 560 that is being received. The sequence ID 566 may be identified or recorded for each item 560 as it is received in a download feed. The sequence ID 566 may be identified or recorded for each item 560 as it is received in the real-time data feed. The items may be stored in a database 568 or otherwise tracked by the client device 410 according to the sequence number 566 so that orders in an ordered sequence may be identified.

Figure 6:
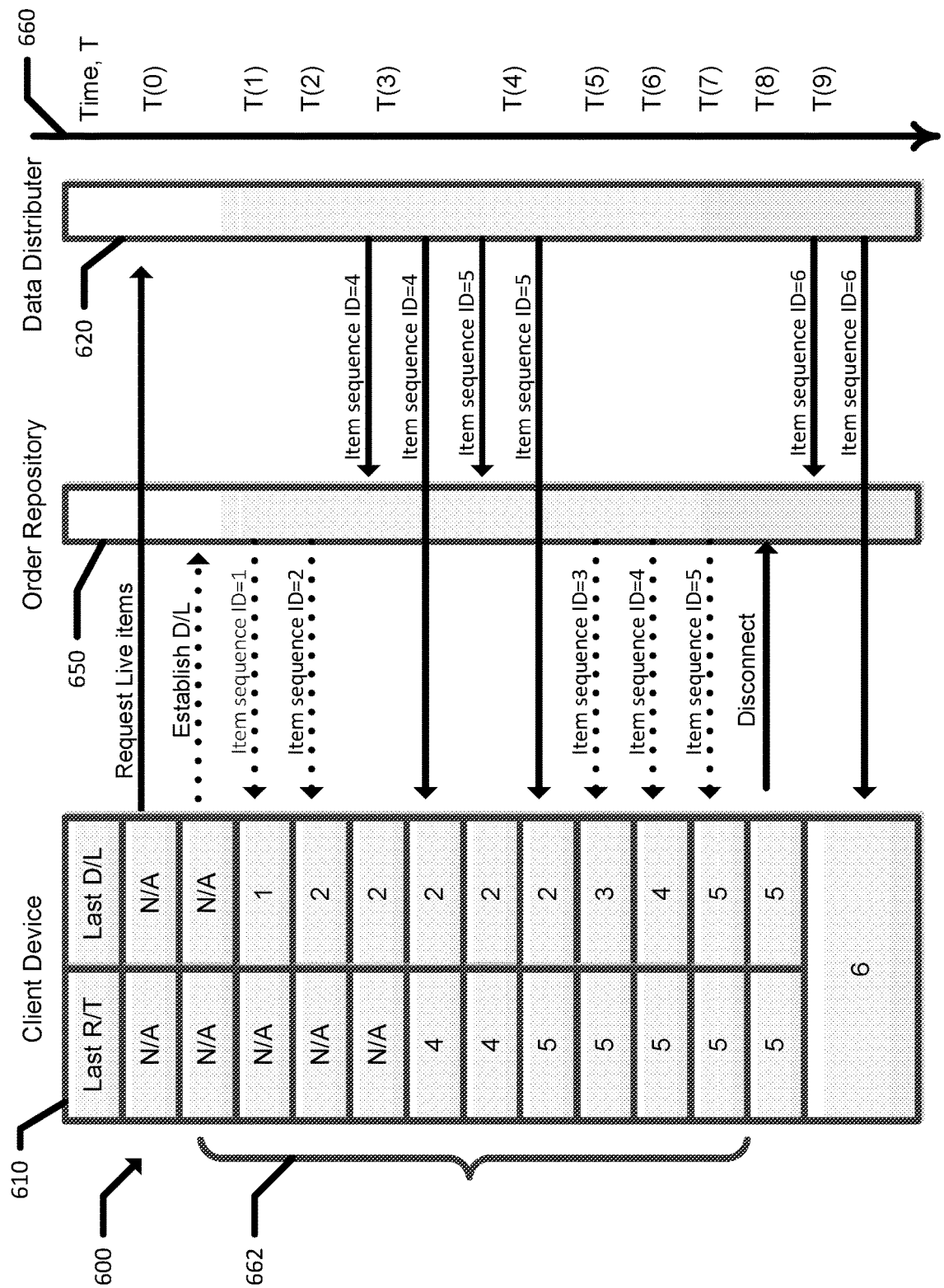
FIG. 6 illustrates a block diagram for an embodiment for merging downloaded data with real-time data feeds.

FIG. 6 illustrates an example for a system 600 where downloaded data is merged with data received from a real-time data feed. The system of FIG. 6 includes client device 610, order repository 650 and data distributer 620. The client device 610 may be similar to client device 410 in FIG. 4, the trading device 110 in FIG. 1, trading device 210 in FIG. 2 and computing device 300 in FIG. 3. The order repository 650 may be similar to the order repository 450 in FIG. 4 and the data distributer 620 may be similar to data distributer 420 of FIG. 4. FIG. 6 illustrates items provided to client device 610 from both the order repository 650 and data distributer 620 over time T. Time is represented along the time axis 660. FIG. 6 also illustrate a time at which the events occur, such as at times T(0) to T(9). Though the events may be shown as linearly distributed along the time axis or at the same or substantially the same time interval, it should be understood that the events may occur at different time intervals. Though the events also may be shown as separated by a time interval, it should be understood that events may occur simultaneously or substantially simultaneously.

Time T(0) may represent a time when a client device 610 begins listening or subscribing to a real-time data feed. To establish the connection, a request to data distributer 620 is sent at time T(0) to receive real-time data from the data distributer 620. The connection with the data distributer 620 may be established through a request, query, login, or other message sent from the client device 610 to data distributer 620.

The client device 610 also may establish a connection or session with order repository 650. At time T(0), the client device 610 may establish a connection with the order repository. The session may be established to receive data from the order repository from a known point in time, moment in time, or other reference point, such as some prior point in time. The connection may be considered not bounded by any pre-determined size or set of items. The order repository will download data to the client device 610 until the order repository receives an instruction to stop the download, such as via a request from the client device 610 to stop download. The connection with the order repository 650 may be established through a request, query, login, or other message sent from the client device 610 to order repository 650.

With both the subscription to the real-time data feed from the data distributer 620 and the connection with the order repository 650 established, the client device 610 may begin receiving data from both the data distributer 620 and the order repository 650. Because the downloaded data from the order repository 650 may be considered delayed with respect to the real-time data from the data distributer 620, the downloaded data is merged with the real-time data.

The client device 610 may be configured to note a sequence ID 566 of the data received at the client device 610. In an example, the client device 610 notes the sequence ID 566 of the data it is receiving in the real-time data feed as well as the data in the downloaded data. The sequence IDs 566 may not need to be all-inclusive and/or ordered.

As shown in FIG. 6, data is communicated from order repository 650 and data distributer 620 to client device 610. For the data, a unique identifier for each item of data, such as data sequence ID 566 as described with respect to FIG. 5, is noted, logged, stored, cached or otherwise recorded for a comparison at client device 610. In an embodiment, the sequence ID 566 for an item of data from a data source is compared to the sequence ID 566 of an item of data previously received at the client device 610 from the same data source. For example, the sequence ID 566 for an item of data received from the order repository 650 is compared to the sequence ID 566 of a previously received item of data received from the order repository 650. Similarly, the sequence ID 566 for an item of data received from the data distributer 620 is compared to the sequence ID 566 of a previously received item of data received from the data distributer 620. The sequence IDs 564 are compared to determine a most recent item of data, or the last item of data, received from each data source.

The last items of data from each source may be compared to determine when the client device may begin to receive data from only a single source, such as the real-time data feed. After the last item of data is determined for one data source, that last item of data may be noted and compared a last item of data from another data source. In response to determining that the last items of data from both sources match, the client device 610 may determine that the data has been merged. For example, when the sequence IDs 564 for the items of data from both sources match, the downloaded set from the order repository may be considered fully inclusive of the real-time items that had been sent. Prior to determining that the sequence IDs 564 match, the client device may will handle real-time items simply by noting the sequence ID 566 and ignoring the item. This could be optimized by including the sequence ID in a header so that the body of the message need not be unpacked, saving processing time.

FIG. 6 shows that at time T(1), the client device 610 downloads a first item of data (sequence ID=1) from the order repository 650. The sequence ID 566 may be noted, stored, cached or otherwise recorded at the client device for a comparison to determine whether the sequence ID 566 matches a sequence ID 566 of a last item of data received from the order repository. As shown in FIG. 6, prior to time T(1) (e.g. time T(0)), there was no last item downloaded from the order repository 650 (Last D/L=N/A). So, at time T(1), the last downloaded item of data is determined to be the first item of data having sequence ID 1.

As shown in FIG. 6, the last downloaded item of data, and/or the sequence ID of the last downloaded item of data, at time T(1) is compared to the last real-time item of data, and/or the sequence ID of the real-time item of data, that was received at the client device 610. Since no data has been received at time T(1) from the real-time data feed from the data distributer, the client device 610 does not have a last item of data from the real-time data source. As such, FIG. 6 shows that the sequence ID 566 for the item of data received via the real-time data feed at time T(1) is N/A.

At time T(2), the data distributer 620 has not yet transmitted data to the client device 610, but client device 610 has downloaded another item of data from the order repository with the sequence ID of 2. The sequence ID 566 of the last downloaded item of data is compared to the sequence ID 566 of the previously downloaded item of data, which was noted by the client device. Based on the comparison, the client device 610 determines that the last downloaded item of data has a sequence ID of 2, since the item of data with a sequence of 2 was determined to be more recent than the item of data with a sequence ID of 1. At time T(2), the client device does not have an item of data from the real-time data feed from the data distributer 620.

At time T(3), the data distributer 620 publishes a new item of data, which in the example has a sequence ID of 4. As shown in FIG. 6, the item of data is provided to both the order repository 650 and client device 610. As also shown in FIG. 6, the client device 610 determines at time T(3), that the last item of data received from the real-time data feed from the data distributer has a sequence ID of 4. As such, FIG. 6 shows at time T(3), the last downloaded item of data has a sequence ID of 2, while the last real-time item of data has a sequence ID of 4. The client device 610 determines that the last items of data do not match.

At time T(4), the data distributer 620 publishes a new item of data, which in the example has a sequence ID of 5 and is provided to both the order repository 650 and client device 610. The client device 610 receives the item of data having the sequence ID of 5 from the data distributer 620 and compares the item of data to the real-time data previously received from the data distributer 620. Since the item of data from the real-time data feed having a sequence ID of 5 is determined to be more recent than the item of data having the sequence ID of 4, the client device 610 determines the item of data having the sequence ID of 5 is the last item of data received from the real-time data feed and records the same. At time T(4), the client device has a last item of data from the download having a sequence ID of 2. As such, FIG. 6 shows at time T(5), the last downloaded item of data has a sequence ID of 2, while the last real-time item of data has changed to the item of data having a sequence ID of 5. The client device 610 determines that the last items of data do not match.

At time T(5), the client device 610 downloads a new item of data from the order repository 620 having a sequence ID of 3. The client device 610 compares the sequence IDs and determines that the last downloaded item of data has the sequence ID of 3. At time T(5), the last item of data from the real-time data feed has a sequence ID of 5, and the client device 610 determines no match between the sequence IDs of the last items of data.

At time T(6), the client device 610 downloads a new item of data from the order repository 620 having a sequence ID of 4 and compares the sequence IDs. The client device 610 determines that the last downloaded item of data has the sequence ID of 4 and the last item of data from the real-time data feed has a sequence ID of 5, which is not a match.

At time T(7), the client device 610 downloads a new item of data from the order repository 620 having a sequence ID of 5, compares the sequence IDs and determines that the last downloaded item of data has the sequence ID of 5. Since the sequence ID of the last item of data from the real-time data feed is also 5, the client device 610 determines that the sequence IDs match.

When the client device 610 determines that the sequence IDs match, the client device 610 may consider that the download from the order repository 650 may be considered complete. The client device 610 also or alternatively may start consuming only those items of data from the real-time data feed from the data distributer 620. Because the download may be considered complete, the client device 610 may send a message to the order repository 650 to end the download. As shown in FIG. 6, at time T(8) the client device sends a message such as a download-end or disconnect message to the order repository 650 to end the download connection. After the download connection has ended, the download lifetime 662 may be considered complete and the client device 610 may no longer receive the data from the order repository 650.

As shown in FIG. 6, at time T(9), the client device 610 receive a new item of data via the real-time data feed having a sequence ID of 6. The client device 610 is no longer receiving the items of data from the order repository 650 and the last item of data is determined to have a sequence ID of 6.

Figure 7:
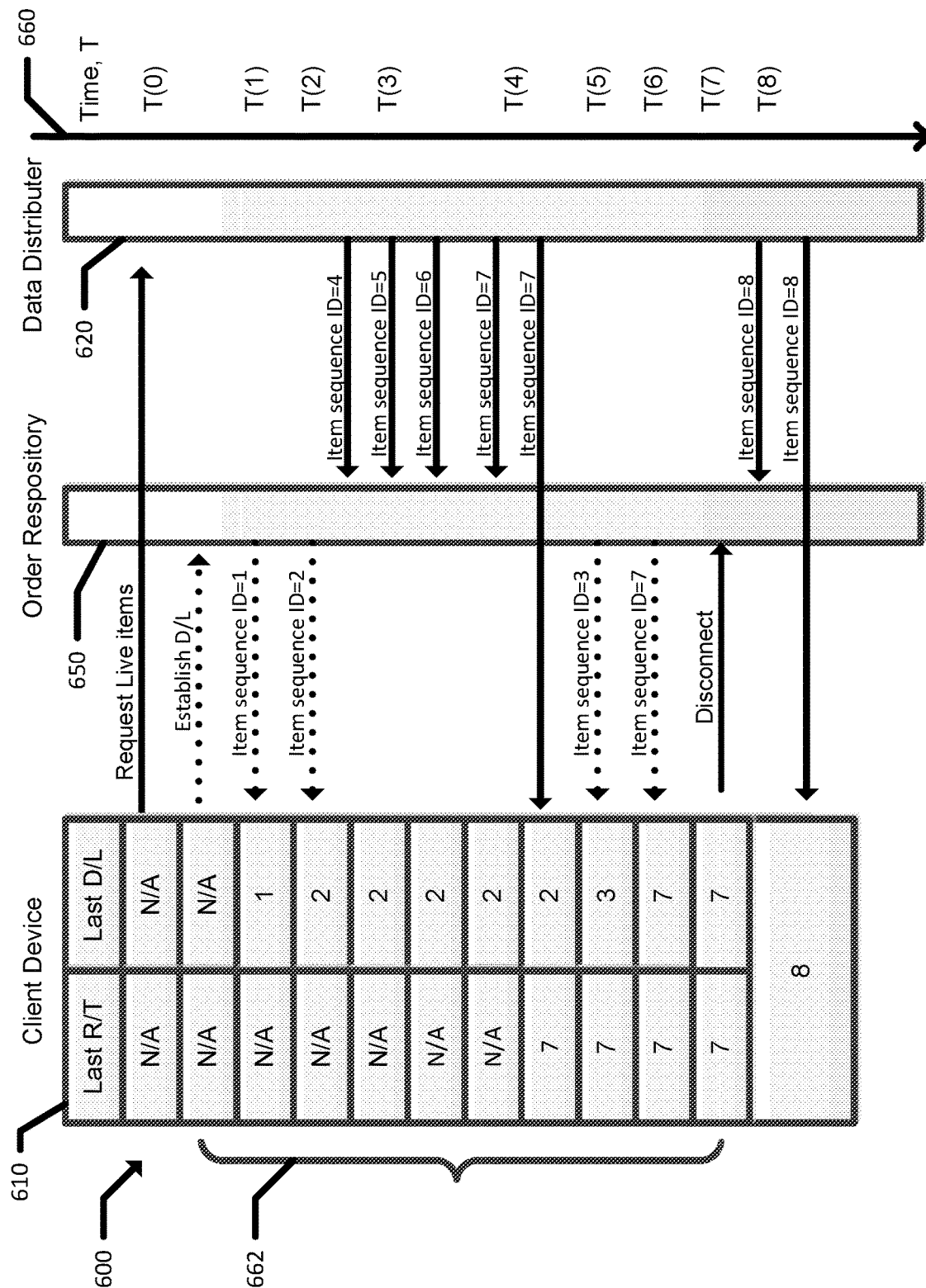
FIG. 7 illustrates a block diagram for an embodiment for merging downloaded data with real-time data feeds, where a client device may not receive all items of data from a real-time data feed.

FIG. 7 illustrates an example for merging downloaded data with a real-time data feed where some data in the real-time data feed may not be received at a client device. In some embodiments, all data from a data distributer 650 may not be destined to a client device. Data from the data feed may be provided by the data distributer 660 to the order repository 650, but may not be distributable to the client device 610. For example, a client device may not have permission to view an entire order book, and thus is provided only with data to which the client device may be entitled to receive. Such filtering of the data may be performed on a server side such that the data is not sent to the client and/or the filtering may be performed by the client.

In FIG. 7, a client device 610 receives downloaded data from order repository 650 and data distributer 620. In FIG. 7 time is generally represented along the time axis 660 and along which times at which the events occur, such as at times T(0) to T(8) are shown. Though the events may be shown as linearly distributed along the time axis or at the same or substantially the same time interval, it should be understood that the events may occur at different time intervals. Though the events also may be shown as separated by a time interval, it should be understood that events may occur simultaneously or substantially simultaneously.

At time T(0), the client device 610 begins listening or subscribing to a real-time data feed by establishing a connection with data distributer 620 to receive real-time data from the data distributer 620. The client device 610 also may establish a connection or session with order repository 650. With both the real-time data feed from the data distributer 620 and the connection with the order repository 650 established, the client device 610, may begin receiving data from both the data distributer 620 and the order repository 650.

At time T(1), the client device 610 downloads a first item of data having a sequence ID of 1 from the order repository 650. Prior to time T(1) (e.g. time T(0)), there was no last item downloaded from the order repository 650 (Last D/L=N/A). So, at time T(1), the last downloaded item of data is determined to be the first item of data having sequence ID 1. The last downloaded item of data at time T(1) is compared to the last real-time item of data that was received at the client device 610. Since no data has been received at time T(1) from the real-time data feed from the data distributer, the client device 610 does not have a last item of data from the real-time data feed. As such, FIG. 7 shows that the sequence ID 566 for the item of data received via the real-time data feed at time T(1) is N/A.

At time T(2), client device 610 has downloaded another item of data from the order repository with the sequence ID of 2, but no data from the data distributer 620. Based on the comparison of the sequence IDs for the downloaded data, the client device 610 determines that the last downloaded item of data has a sequence ID of 2, since the item of data with a sequence of 2 was determined to be more recent than the item of data with a sequence ID of 1. At time T(2), the client device does not have an item of data from the real-time data feed from the data distributer 620.

At time T(3), the data distributer 620 publishes new items of data having sequence IDs of 4, 5 and 6. Although FIG. 7 shows the items of data having sequence IDs of 4, 5 and 6 provided at time T(3), it should be understood that the items of data may be provided at separate or different time. Since the items of data having sequence IDs of 4, 5 and 6 are not to be delivered to the client device 610, the items of data may be provided only to the order repository 650. Since the client device did not receive the items of data having the sequence IDs 4, 5, and 6, the client device still has not yet received an item of data from the real-time data feed and records the last downloaded item of data as having a sequence ID of 4.

At time T(4), the data distributer 620 publishes a new item of data, which in the example has a sequence ID of 7. The item of data having the sequence ID of 7 is provided to the order repository 650 and the client device 610. The client device 610 receives the item of data having the sequence ID of 7 from the data distributer 620 and compares the item of data to the real-time data previously received from the data distributer 620. Since the item of data from the real-time data feed having a sequence ID of 7 is determined to be the most recent, the client device 610 determines the item of data having the sequence ID of 7 is the last item of data received from the real-time data feed and records the same. At time T(4), the client device has a last item of data from the download having a sequence ID of 2. As such, FIG. 7 shows at time T(4), the last downloaded item of data has a sequence ID of 2, while the last real-time item of data has changed to the item of data having a sequence ID of 7. The client device 610 determines that the last items of data do not match.

At time T(5), the client device 610 downloads a new item of data from the order repository 620 having a sequence ID of 3. The client device 610 compares the sequence IDs and determines that the last downloaded item of data has the sequence ID of 3. At time T(5), the last item of data from the real-time data feed has a sequence ID of 7, and the client device 610 determines no match between the sequence IDs of the last items of data.

At time T(6), the client device 610 downloads a new item of data from the order repository 620 having a sequence ID of 7, compares the sequence IDs and determines that the last downloaded item of data has the sequence ID of 7. Since the items of data having sequence IDs 4, 5 and 6 are not to be distributed to the client device, those items are not downloaded to the client device 610 from the order repository 650.

Since both the last item of data from the real-time data feed has a sequence ID of 7 and the last downloaded item has a sequence ID of 7, the client device 610 determines that the sequence IDs for the last items of data match. At time T(7), the client device sends a message, or a request, such as a download-end or disconnect message, to the order repository 650 to end the download connection. After the download connection has ended, the download lifetime 662 may be considered complete and the client device 610 may no longer receive the data from the order repository 650.

At time T(8), the client device 610 receives a new item of data via the real-time data feed having a sequence ID of 8. The client device 610 is no longer receiving the items of data from the order repository 650 and the last item of data is determined to have a sequence ID of 6.

Figure 8:
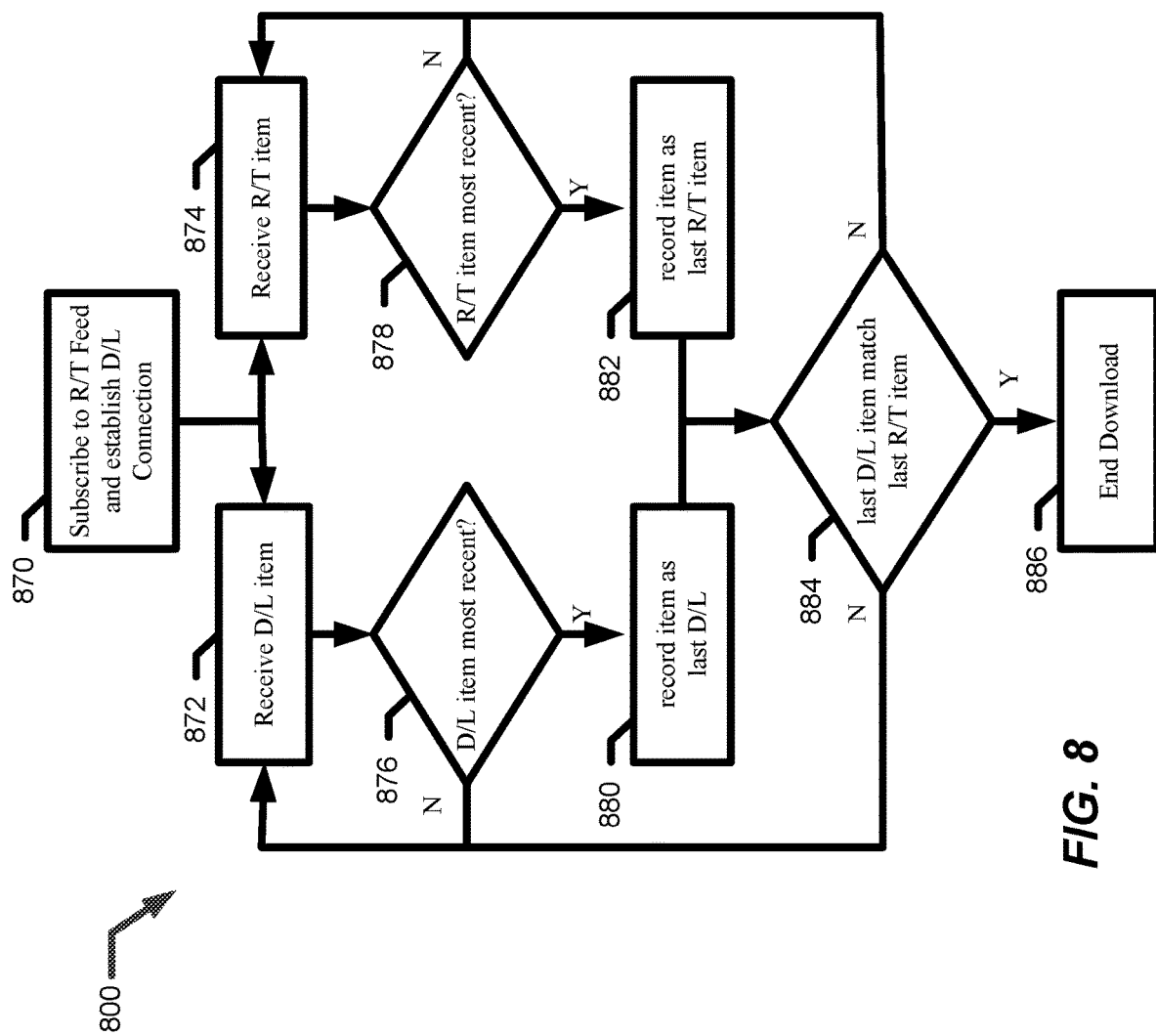
FIG. 8 illustrates a block diagram for a method for merging downloaded data with real-time data feeds.

FIG. 8 illustrates an exemplary flow diagram for merging downloaded data with real-time data feeds. At 870, a subscription to a real-time data feed is made and a connection to a downloaded data is established for a client device. The download connection may be, for example, a connection to an order repository having messages related to a real-time data feed stored therein. The real-time data feed may be from a data publisher, such as an electronic exchange that publishes information for one or more markets for a tradeable object.

At 872, the method includes receiving downloaded items of data from the established download connection. The method also includes receiving at 874 items of data from the real-time data feed. The items of data from the download connection and from the real-time data feed may be received at the same time or substantially at the same time. The items of data from the download connection may be received independent, or substantially independent, from receiving the items of data from the real-time data feed and the items of data from the real-time data feed may be received independent, or substantially independent, from receiving the items of data from the download connection.

At 876, an item of data received from the download connection is compared to a previous item of data received from the download connection. The previous item of data may be cached, recorded, noted, or otherwise stored as a last downloaded item of data for a later comparison. The items of data are compared to determine a most recent item of data received from the download connection. For example, sequence IDs of the items of data may be compared to determine the most recent item of data received from the download connection. If the received item of data is not the most recent, the method includes receiving the next item of data from the download connection at 872 and comparing that downloaded item of data to the stored item of data at 876. If the received item of data is the most recent item of data from the download connection, the item of data is stored at 880 as the last item of data from the download connection.

At 878, an item of data received from the real-time data feed is compared to a previous item of data received from the real-time data feed. The previous item of data may be cached, recorded, noted, or otherwise stored as a last item of data from the real-time data feed for a later comparison. The items of data are compared to determine a most recent item of data received from the real-time data feed. For example, sequence IDs of the items of data may be compared to determine the most recent item of data received from the real-time data feed. If the received item of data is not the most recent, the method includes receiving the next item of data from the real-time data feed at 874 and comparing that item of data to the stored item of data at 878. If the received item of data is the most recent item of data from the real-time data feed, the item of data is stored at 882 as the last item of data from the download connection.

At 884, a comparison is made of the last items of data from the download connection and the real-time data feed. If the comparison results in a determination that the last the last item of data received from the download connection matches the last item of data received from the real-time data feed, the data may be considered merged, and the download connection at 886 may be ended. For example, the sequence ID of the items of data may be compared to determine whether the sequence IDs are the same. If the comparison results in a determination that the items of data do not match, the method include receiving items of data from the download connection at 872 and the real-time data feed at 874.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EE- PROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method for merging downloaded data with a real-time data, the method comprising:

receiving, by a client device from a real-time data feed of a data publisher, a plurality of real-time items of data, each real-time item data of the plurality of real-time items data having a message identifier identifying a position the real-time item of data relative to other real-time items data of the plurality of real-time items data in the real-time data feed;

downloading, by the client device from a download connection with a data repository, a plurality of downloaded items of data, where each downloaded item of data of the plurality of downloaded items of data includes the message identifier and is received at the data repository from the data publisher;

determining, by the client device according to the message identifier of the downloaded items of data, a most recent downloaded item of data of the plurality downloaded items of data;

determining, by the client device according to the message identifier of the real-time items of data, a most-recent real-time item of data of the plurality of real-time items of data received from the real-time data feed;

comparing, by the client device, the most recent downloaded item of data downloaded by the download connection from the data repository with the most-recent real-time item of data received by the real-time data feed of the data publisher to determine a match according to the message identifier of the real-time item of data matching the message identifier of the downloaded item of data; and responsively ending, by the client device, the download connection in response to the determined match between the compared message identifier of the real-time item of data and the message identifier of the downloaded item of data.

2. The method of claim 1 further comprising establishing by the client device the download connection with a data repository.

3. The method of claim 1 where the data repository comprises an order repository.

4. The method of claim 1 further comprising establishing by the client device a connection with the real-time data feed.

5. The method of claim 4 where establishing comprises subscribing to the real-time data feed.

6. The method of claim 1 where the data publisher comprises an electronic exchange.

7. The method of claim 6 where the downloaded item of data and the real-time item of data comprise market data.

8. The method of claim 1 further comprising receiving at the data repository the real-time item of data from the real data feed.

9. The method of claim 1 where the downloaded item of data comprises a previous real-time item of data stored by the order repository.

\* \* \* \* \*